July 29, 1969   E. D. MARADYN   3,457,971
LOG HANDLING MACHINE
Filed April 3, 1967   2 Sheets-Sheet 1
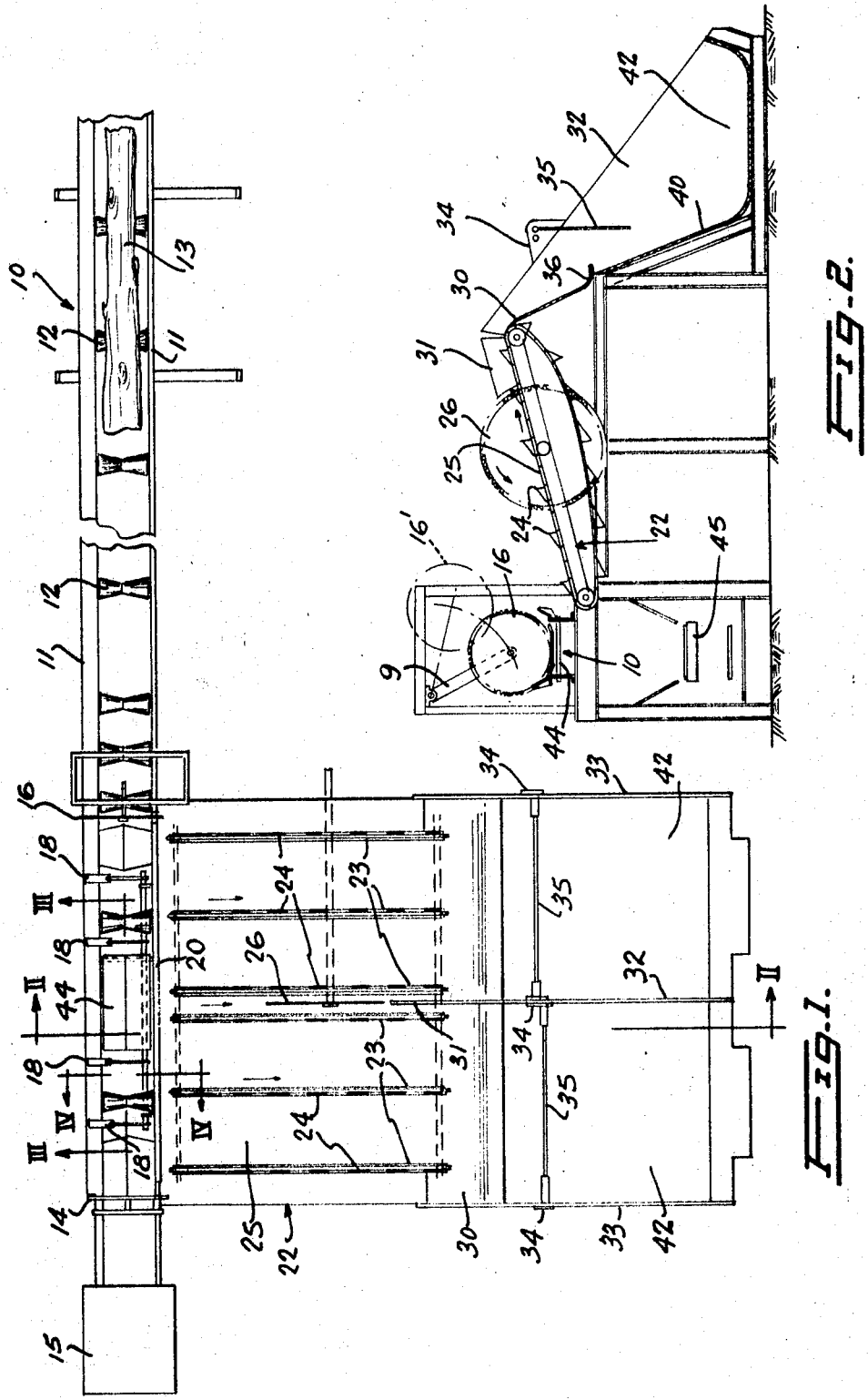

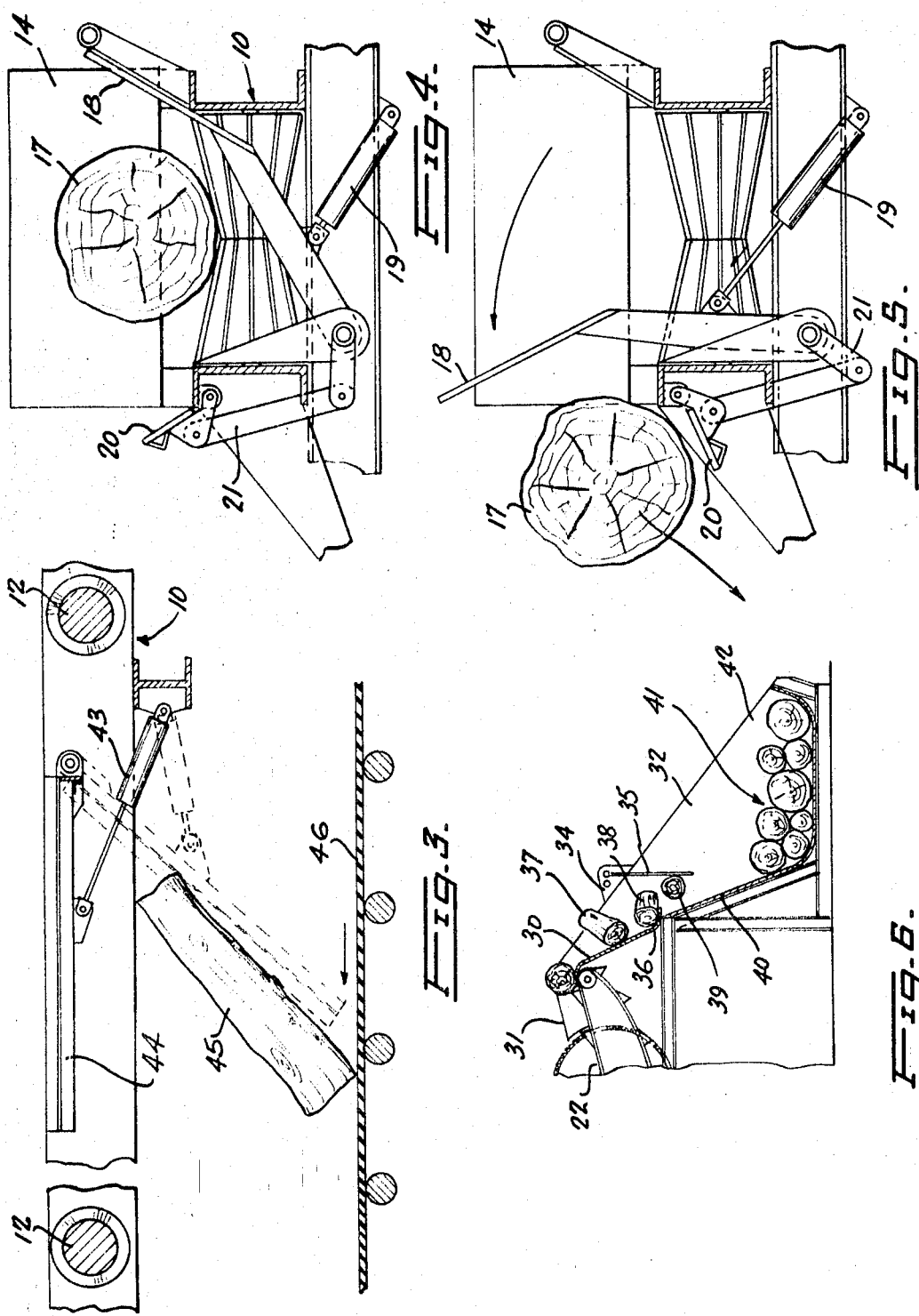

3,457,971
LOG HANDLING MACHINE
Edward D. Maradyn, Fort William, Ontario, Canada, assignor to The Northern Engineering & Supply Co., Limited, Fort William, Ontario, Canada
Filed Apr. 3, 1967, Ser. No. 627,698
Int. Cl. B27b 5/00, 25/00
U.S. Cl. 143—48					6 Claims

ABSTRACT OF THE DISCLOSURE

A machine for handling, cutting and stacking logs in which the cut logs are deflected from the side of a first longitudinal conveyor (FIGURES 4 and 5) onto a second conveyor on which they travel sideways (FIGURE 2). On the second conveyor they encounter a saw which cuts them transversely into smaller logs. The logs then fall down a chute (FIGURE 6) into a stacking bin, on route striking a horizontal surface that aligns them in one sense, and being deflected from the horizontal surface against a pivoted flap that aligns them in a second sense.

---

Tree ends that are too short to form full length logs are deflected from the first conveyor down onto a waste conveyor (FIGURE 3).

This invention relates to improvements in machines for use in the logging industry, and more particularly to machines that serve to cut a stripped tree trunk into the required short lengths for subsequent handling, and that also serve readily to stack such cut logs in neat stacks for subsequent transportation.

The objects of the invention are to provide general improvements in log handling machines, and more particularly in machines for cutting logs from tree trunks; rejecting short logs; and forming the cut logs into parallel stacks of a type that are especially convenient for subsequent handling.

The various features of the invention will become apparent in more specific detail from the description that follows.

One form of machine constructed in accordance with the various aspects of the present invention is illustrated diagrammatically in the accompanying drawings. It is desired to emphasize that the machine illustrated is shown by way of example only and not by way of limitation, the broad scope of the various aspects of the present invention being defined in the appended claims.

In the drawings:

FIGURE 1 is a general plan view of the machine;

FIGURE 2 is a section on the line II—II in FIGURE 1;

FIGURE 3 is an enlarged section on the line III—III in FIGURE 1;

FIGURE 4 is an enlarged section on the line IV—IV in FIGURE 1;

FIGURE 5 is a view similar to FIGURE 4 showing the parts in a different position; and FIGURE 6 is a view of a fragment of FIGURE 2 showing the manner of operation of this part of the machine.

As seen in FIGURE 1, the machine includes an elongated conveyor 10 comprised of vertical side retaining walls 11 and a series of power-driven toothed rollers 12. This construction is conventional and consequently details have been omitted. Stripped tree trunks, such as the one a portion of which is shown at 13, are loaded onto the conveyor 10 by a crane (not shown), for conveyance by the rollers 12 along the conveyor to an end stop 14. Depending on the size of the tree trunks, more than one may be loaded simultaneously. For convenience only a single trunk is shown at 13 in FIGURE 1, but it is to be understood that a plurality of such trunks may be processed simultaneously. When one or more tree trunks have reached the end stop 14, the operator who oversees and controls the operation of the machine from a cabin 15, causes a circular saw 16 mounted on a swinging arm 9 to be lowered from the position shown in broken lines in FIGURE 2 to that shown in full lines, to cut through each tree trunk and form a log of the required length. The operation of this saw is also conventional, and accordingly it has been deemed unnecessary to show details of the drive mechanisms for rotating and for swinging the saw.

FIGURE 4 shows the portion of the machine on which a severed log, here designated 17, now rests, and it will be seen that four kicker members 18 are provided, which can be actuated by a pneumatic cylinder 19 in the manner shown in FIGURE 5, that is to push the log 17 laterally off the conveyor 10. Simultaneously with operation of the kicker members 18 a movable section 20 of the side retaining wall of the conveyor, which wall is connected to the kicker members 18 by a linkage 21, is lowered to enable this lateral displacement of the log 17.

The log 17 now falls onto a second driven conveyor 22 which takes the form of six parallel endless chains 23 each carrying a series of teeth 24 projecting above a base plate 25. The conveyor 22 serves to convey the log 17 past a second circular saw 26 situated centrally of the log 27, which saw 26 thus serves to cut this log into a pair of shorter logs, each of a length required for subsequent handling.

These shorter logs continue to travel up the conveyor 22 until beyond its upper end they tumble down a first ramp 30, as demonstrated by the logs in FIGURE 6. At this stage the short logs that have been severed from each other by the saw 26 travel in spaces that are separated from each other by dividing walls 31 and 32. The collection and stacking zones in which the logs now find themselves are also defined by side walls 33. Brackets 34 extend upwardy from both the dividing and side walls 32 and 33 to provide pivotal support for a pair of flaps 35 that are freely pivotally mounted on these brackets. These flaps 35 are constructed of steel, but may have rubber pads on their surfaces contacted by the logs to reduce noise.

Each ramp 30 terminates at its lower end in a smoothly curved horizontal foot portion 36. As is demonstrated in FIGURE 6, a typical log 37 falling down the ramp 30 from the conveyor 22 may well fall with one end lower than the other. However, by virtue of striking the foot 36, this lack of alignment of the log is corrected, its longitudinal axis now being brought to the horizontal (see the log 38). The log on being deflected beyond the end of the foot 36 may, however, still retain some lack of the proper alignment required. This consideration is demonstrated by the log 38, the axis of which, although horizontal, is not yet parallel to the surface of the ramp 30, one end of the log being nearer to the flap 35 than the other end, i.e. the log is not truly perpendicular to the walls 32, 33. It is found that this form of misalignment is corrected by the flap 35 which the log 38 now strikes, as demonstrated by the log designated 39 which has been aligned in both senses, that is with its longitudinal axis both horizontal and normal to the walls (i.e. parallel with the pivotal axes of the flaps 35). The log axis is thus now parallel to a second ramp 40 down which each log now slides to take up a correctly aligned position in a stack 41 of logs in a bin 42 formed on each side of the dividing wall 32 by the side walls 33, from which bins 42 the stacks 41 can be removed by the grab of a further crane (not shown) for piling onto a truck, railroad car or whatever other subsequent conveyance is to be used. It has been found important to allow the flaps 35 to swing freely in order to allow passage of the larger logs and prevent jamming.

When the opeartor can see that the portion of the tree remaining after cutting off a number of logs is too short to occupy fully the space between the stop 14 and the saw 16, so that to continue to allow the tree to proceed along the conveyor 22 would result in a short log in one of the pits 42, he operates a pneumatic cylinder 43 to move a trap-door portion 44 of the floor of the conveyor 10 to the broken line position shown in FIGURE 3, thus dumping the short length of log 45 onto a scrap conveyor 46 located beneath the main conveyor 10.

I claim:
1. A log stacking mechanism for receiving logs from the end of a conveyor and for arranging these logs side-by-side with aligned ends as a stack, said mechanism comprising,
 (a) a downwardly inclined ramp,
 (b) means for supplying logs to the upper end of said ramp to fall down said ramp with their longitudinal axes extending generally horizontally,
 (c) said ramp comprising a flat steeply downwardly sloping main surface terminating at its lower end in a flat horizontal foot portion for receiving each log falling down the ramp to correct any misalignment of its longitudinal axis from the horizontal and for deflecting each log horizontally beyond the end of such foot portion,
 (d) a flap, and means freely pivotally mounting said flap about a horizontal axis to hang down at a location adjacent said foot portion and in the path of each log deflected therefrom to correct any misalignment of its longitudinal axis from parallelism with said flap axis,
 (e) and wall means defining a bin located below said flap for receiving aligned logs therefrom for forming in said bin a stack of logs in a parallel side-by-side relationship with their ends substantially aligned with each other.

2. In a log handling machine,
 (a) a first conveyor comprising side retaining walls and propelling means therebetween for transporting stripped tree trunks in the direction of their longitudinal extent,
 (b) a stop in the path of travel of said trunks on said conveyor,
 (c) a saw located upstream of said conveyor from said stop, and means mounting said saw to be movable transversely of the direction of travel of the conveyor to sever from each trunk its portion intermediate the saw and the stop, whereby to form a log,
 (d) a second conveyor disposed adjacent a side of the portion of the first conveyor that extends between the saw and the stop, for receiving logs deflected laterally from said first conveyor and for transporting said logs to a stacking zone,
 (e) kicker means in said portion of the first conveyor for engaging the side of a log thereon opposite to the second conveyor to deflect said log onto said second conveyor,
 (f) means mounting a section of said side retaining wall extending along said portion on the side thereof adjacent said second conveyor to be movable between a normal erect position in which it impedes lateral movement of a log from the first conveyor onto the second conveyor and a retracted position in which it enables such lateral movement of a log,
 (g) and means for simultaneously operating said kicker means and said wall section mounting means for deflecting a log onto said second conveyor.

3. A log handling machine according to claim 2, including
 (h) trap-door means in said portion of the first conveyor,
 (i) and means for moving said trap-door means between a normal log-supporting position and a lowered position for deflecting a log downwardly off said first conveyor.

4. In a log handling machine,
 (a) a conveyor comprising side retaining walls and propelling means therebetween for transporting stripped tree trunks in the direction of their longitudinal extent.
 (b) a stop in the path of travel of said trunks on said conveyor,
 (c) a saw located upstream of said conveyor from said stop, and means mounting said saw to be movable transversely of the direction of travel of the conveyor to sever from each trunk its portion intermediate the saw and the stop, whereby to form a log,
 (d) trap-door means in the portion of the conveyor that extends between the saw and the stop,
 (e) and means for moving said trap-door means between a normal log-supporting position and a lowered position for deflecting a log downwardly off said conveyor.

5. A log handling machine according to claim 2, including a stacking mechanism comprising
 (a) a downwardly inclined ramp,
 (b) means locating said ramp with its upper end disposed adjacent said second conveyor to receive logs therefrom to fall down said ramp with their longitudinal axes extending generally horizontally,
 (c) said ramp comprising a flat steeply downwardly sloping main surface terminating at its lower end in a flat horizontal foot portion for receiving each log falling down the ramp to correct any misalignment of its longitudinal axis from the horizontal and for deflecting each log horizontally beyond the end of such foot portion,
 (d) a flap, and means freely pivotally mounting said flap about a horizontal axis to hang down at a location adjacent said foot portion and in the path of each log deflected therefrom to correct any misalignment of its longitudinal axis from parallelism with said flap axis,
 (e) and wall means defining a bin located below said flap for receiving aligned logs therefrom for forming in said bin a stack of logs in a parallel side-by-side relationship with their ends substantially aligned with each other.

6. A log handling machine according to claim 3, including a stacking mechanism comprising
 (a) a downwardly inclined ramp,
 (b) means locating said ramp with its upper end disposed adjacent said second conveyor to receive logs therefrom to fall down said ramp with their longitudinal axes extending generally horizontally, (c) said ramp comprising a flat steeply downwardly sloping main surface terminating at its lower end in a flat horizontal foot portion for receiving each log falling down the ramp to correct any misalignment of its longitudinal axis from the horizontal and for deflecting each log horizontally beyond the end of such foot portion, (d) a flap, and means freely pivotally mounting said flap about a horizontal axis to hang down at a locacation adjacent said foot portion and in the path of each log deflected therefrom to correct any misalignment of its longitudinal axis from parallelism with said flap axis, (e) and wall means defining a bin located below said flap for receiving aligned logs therefrom for forming in said bin a stack of logs in a parallel side-by-side relationship with their ends substantially aligned with each other.

References Cited

UNITED STATES PATENTS

| | | | |
|---|---|---|---|
| 1,759,835 | 5/1930 | Boynton | 143—48 X |
| 1,774,047 | 8/1930 | Wharton | 143—92 X |
| 2,039,017 | 4/1936 | McLeod | 143—92 X |
| 2,410,887 | 11/1946 | Locke | 143—55 |
| 2,889,858 | 6/1959 | Roberts | 143—92 X |
| 2,938,552 | 5/1960 | Rogers | 143—48 X |
| 2,960,123 | 11/1960 | O'Quinn | 143—92 X |
| 3,236,274 | 2/1966 | Eynon | 143—46 X |

HARRISON L. HINSON, Primary Examiner

U.S. Cl. X.R.

143—46, 55, 92; 214—6